(12) United States Patent
Abahusayn

(10) Patent No.: US 7,972,391 B2
(45) Date of Patent: Jul. 5, 2011

(54) SALT BRINE CAPILLARY CRYSTALLIZATION

(76) Inventor: Mansur Abahusayn, Irvine, CA (US)

( * ) Notice: Subject to any disclaimer, the term of this patent is extended or adjusted under 35 U.S.C. 154(b) by 868 days.

(21) Appl. No.: 11/899,679

(22) Filed: Sep. 7, 2007

(65) Prior Publication Data

US 2009/0065153 A1   Mar. 12, 2009

(51) Int. Cl.
*C01D 5/00*   (2006.01)
(52) U.S. Cl. ...................................... 23/302 T; 23/302 R
(58) Field of Classification Search .................. 23/302 T, 23/302 R
See application file for complete search history.

(56) References Cited

U.S. PATENT DOCUMENTS

| | | | |
|---|---|---|---|
| 2,660,236 A | 11/1953 | Farnsworth | |
| 4,334,886 A | 6/1982 | Tani | |
| 5,068,092 A * | 11/1991 | Aschauer | 422/253 |
| 6,027,607 A | 2/2000 | Gracia | |

OTHER PUBLICATIONS

Duniway, Michael C., Herrick Jeffrey E, and Monger H. Curtis: The High Water-Holding Capacity of Petrocalcic Horizons—Abstract Soil Sci Soc Am J 71:812-813 (2007).
Jose, I. Faria, et al.: Solar Evaporator for Integrated on—Farm Drainage Management (IFDM) System at Red Rock Ranch.
Warren, John K.: Evaporities: Sediments, Resources and Hydrocarbons. Springer 2006.
Yehia A. Ali, and Ian West: Relationships of modern gypsum nodules in sabkhas of loess to compositions of brines and sediments in northern Egypt. Journal of Sedimentary Research; Dec. 1983; v. 53; No. 4; p. 1151-1168.
Childs, E.C., ScD, A.H Cole and D.H. Edwards, Phd, : The measurement of the Hydraulic Permeability of Saturated Soils In situ. II—Abstract JSTOR: Proceedings of the Royal Society of London.

* cited by examiner

*Primary Examiner* — Edward M Johnson
(74) *Attorney, Agent, or Firm* — Curtis L. Harrington; Kathy E. Harrington; Harrington & Harrington

(57) ABSTRACT

This invention relates to a method of crystallization of salt from brine on top of any soil surface through airborne brine droplet crystallization, controlled moisture depth, capillary action and enhanced renewable energy to grow a layer of salt which can be collected. The brine is pumped from an underground source, sprayed in ambient air over a solid surface and, if water is not completely evaporated, allowed to seep through the surface to saturate the capillary zone. Water is evaporated while the sprayed brine is in the air or on the surface where capillary action brings it up to the surface for the water component to be evaporated by net heat gained from the environment resulting in salt crystallization. The evaporation of sprayed brine is enhanced by smaller droplet size, residence time due the spray height and wind machines to reduce humidity and increase natural thermal input. The salt layer thus formed further grows by capillary action of the soil and the crystalline salt to a depth suitable for conventional mechanical harvesting. Instrumentation is included to optimize the method through the measurement of evaporation and moisture content of the lower boundary of the capillary zone of the soil and or crystalline salt.

15 Claims, 1 Drawing Sheet

SALT BRINE CAPILLARY CRYSTALLIZATION

FIELD OF THE INVENTION

The present invention relates to improvements in devices and process for producing salt from brine and more easily and efficiently collecting the salt crystals, and more particularly to a process which enables salt from a brine to be extracted through a soil zone known as a capillary zone which will enable salt to be extracted with much less energy and much less land area for a given amount of salt to be produced.

BACKGROUND OF THE INVENTION

Salt annual world production of 250 million tons is used primarily by the chemical industry (70%), the food industry (10%), road deicing (10%) and (10%) for other uses. The Salt Institute has listed the ways salt is produced as including underground mining of salt deposits, solar evaporation of salt containing water from seas and lakes. In another method known as solution mining, brine is produced underground by pumping water to dissolve salt deposits and then pumping the dissolved brine to the surface or mechanical evaporation where salt is concentrated by any of a number of methods including heating, vacuum, precipitation. Other process steps for all of the above recovery methods may include removal of impurities with recycling of heat for higher efficiency.

In all of the above production methods energy is needed to heat, vacuum, pump, mix, and transport the product, and extensive coastal land is required. Removal of impurities requires either extensive foot print for solar Salinas, which rely on precipitation of undesirable salt constituents and zoological/biological process to reduce organic contaminations. Chemical processing under controlled conditions is required to precipitate and remove undesirable components. These processes require extensive investments, space, and energy and, save properly designed Salinas, tend to be polluting. Coastal areas now being used to evaporate sea water in salt ponds or Salinas are being encroached upon by tourism and urban development making the land too expensive for salt production.

The high cost of energy could be lowered by using renewable energy salt production is still expensive and requires unduly large land areas. Production methods that can achieve high product quality with maximum renewable energy and a smaller footprint, will have a more competitive edge and are more environmentally acceptable.

Where a pond or other holding body is used the sealing of the bottom of the pond is expensive, and the harvesting operation always produces some form of wear and tear on the pond bottom, ranging from gravity effects of equipment wear to inadvertent loss of integrity of sealing of the pond bottom. Filling the pond with brine and waiting for sun and wind to remove the water is a process requiring significant time which allows undesirable organic matter to grow and requires costly cleanup.

Production of salt by spraying through enhanced heat exchange has been described in U.S. Pat. No. 6,027,607 which is dependent on the availability and proximity of heat from an industrial plant, a significant limitation. This process may be more properly characterized as a method for spending waste heat than an economic process for the production of salt. Production of salt in a pond, as described by the patent, will also require dredging of the salt deposited in the bottom of the pond, an expensive process. Dredging can also produce colloidal clay particles ingrained into the salt crystals which requires expensive treatment.

Other processes, such as the Grainer process described in U.S. Pat. No. 2,660,236, rely on evaporation of water to concentrate and deposit the salt but the expense of fuel and complexity of exchanging heat and maintenance of piping and pumps end up with an expensive salt and potential failure due to mechanical maintenance problems.

In another process, U.S. Pat. No. 4,334,886 describes concentration of salt based on natural evaporation through recycling of the brine to cascade down a tower and adding salt to assist in crystallization. Even though the process uses natural heat source, it requires erection of a tower and sacrificing part of the salt to concentrate the brine which makes the process inefficient and difficult to automate for collecting.

It is therefore desirable to produce crystalline salt on the surface from efficiently evaporating brine by heat from the sun and wind on soils that may be porus without sealing the underlying surface and building retaining walls to contain the brine while it evaporates. It is also desirable that the crystallization of brine into salt is fast such that biological products are not allowed to form. If undesirable biological products form, they must be removed through expensive, time consuming and extensive land environmentally sensitive processes.

SUMMARY OF THE INVENTION

It is possible to use the combination of natural energy sources of the sun and wind to evaporate water from brine, in combination with the capillary forces of the soil and crystalline salt to "grow" a salt layer by capillary action. The method, equipment and instrumentation preferably involves spraying the brine into the atmosphere over a brine field in such a way as to cause the formation of a capillary layer. As will be shown, the capillary layer is maintained in different ways in different soil conditions.

By spraying, the operator can minimize the droplet size and can also increase the residence time so that the brine droplet is suspended in the air for a longer period of time such that evaporation is increased significantly. In some cases, the brine crystallizes while it is in the air and falls to the ground as white crystalline salt. This is mainly expected to happen significantly during the hottest and windiest part of the day and for concentrated brine.

When spraying of brine ceases, any brine which has seeped below the surface and is no longer in contact with the sun or wind may be brought up to the surface by capillary action. It is therefore advantageous to take advantage of this natural process, which arises from the surface tension of a capillary of liquid within the soil or crystalline salt vertical pore column. In order for the capillary rise to take place most effectively, it is important to stop the spraying when the brine horizontal boundary within the soil is not substantially lower than the lower boundary of the capillary zone. This method uses minimal energy to lift the brine up to the soil surface for it to crystallize into solid salt and allows the mechanical harvesting of the salt to be carried away in a dump truck. Spraying devices are described to achieve additional benefits such as piling of salt and curing it.

It has been observed in hot and dry climates and in many commonly encountered desert soils that the conditions for high quality and lower cost salt production may be achieved through natural processes that create sabkhas which, according to Warren, John K. in his book entitled Evaporites: Sediments, Resources and Hydrocarbons, Springer 2006) are salt flats with crystalline salt on the surface. Saturated underground brine within the capillary zones of sabkhas is the source of this deposited salt which has been lifted by capillary action to the surface to crystallize upon exposure to sun and wind.

A combination of elements in which the underground brine may be pumped and sprayed on the soil surface and the excess liquid brine is retained within the capillary zone using the appropriate instrumentation will produce crystalline salt economically and make it available to traditional collection and washing process eliminating much of the additional processing, costs and large land area that current methods employ.

Most desert countries are scarcely populated and, where countries have substantial coastlines with nearby salt flats or sabkhas, substantial high quality salt could be produced at substantially lower cost than by current systems if the current process that naturally produce salt on the surface are used to grow the salt on the surface for harvesting. Salts on the surface of a sabkha has been lately shown to result not from marine or continental flooding but from deeply circulated resurging continental underground saline water through capillary action (Warren).

As will be shown in more detail, the control of the level of a capillary zone which can be placed in communication with an upper surface can provide a method whereby a salt layer can be "grown" at the surface as an upper layer which can be much more easily scraped or sliced off than in having to form an impermeable pit. Further, the surface harvesting can be performed without disrupting the salt production operations in adjacent areas.

It is because the salt collects at ground surface that it can be more easily collected and at a higher purity and with greater ease than a pit operation. Further, whereas pit operations are somewhat batch operated, the system and method of the invention enables a more continuous operation which promotes constant, generally uninterrupted growth and harvesting. The top layer of a unit area can be scraped off and as soon as the scraping device is completed, possibly in less than an hour, the growth process can continue.

It is typical in deep salt mining for brine to be pumped from a well commonly used to inject water into a salt layer hundreds or thousands of feet below ground to produce brine which is then pumped to the surface and crystallized by the process of the invention herein). The key to operations, of producing salt is spraying the brine on the surface of any soil and what is not crystallized in the air is held in the capillary zone upon termination of spraying and can migrate upward to further crystallize more salt.

The invention contemplates the creation and maintenance of a brine "capillary zone" between the ground surface and the underground strata. The creation of this zone is performed by insuring that the crystalline salt loading of soil material extending between the surface and the brine layer presents a sufficiently small porosity to enable brine to be continuously wicked upward toward the surface to be evaporated and deposited as crystalline salt it.

The creation of the brine capillary zone is begun by starting a concentrated salt layer at the top surface by spraying brine into smaller droplets which will form a crystalline cap. The higher salt gradient at the top will help wick the brine through an established brine capillary layer by both capillary action and tendency of the brine to travel into the most concentrated crystalline salt layer which will exist at the surface.

At the very beginning of the process, any excess brine which is sprayed onto the top surface will seep into the ground through the uppermost concentrated crystalline layer. As it seeps through the ground (regardless of the ground material) it will set up a gradient which ranges from a crystalline concentrated level at the surface to a brine level at the point it reaches the lowermost brine layer. Once this is established, the brine will begin to be wicked toward the surface. On its way to the very top most surface it becomes more and more concentrated while it carries dissolved salt upward to the surface crystallizing as the solubility of the salt is exceeded.

Salt transported into and through the surface layer will be deposited at the surface in the form of sun and wind dried crystalline salt. As the upper crust continues to dry through the action of wind and sun, more and more salt will be transported to the surface. In the end, the salt at the surface will have some combination of origin, either originating by being sprayed on, or originating by being drawn through the surface.

At the beginning of the operation, when the capillary zone is being established, nearly all of the salt at the surface will come from spraying. At the surface, some of the spraying will result in a thin layer of salt at the surface, while some brine will soak through the upper salt layer and into the ground. The initial brine from the surface begins to set up a salt gradient extending into the soil media. A gradient of more salt near the top of the soil media to less salt in the deeper media is created. As more and more highly concentrated brine begins to move past the top crystalline salt layer a capillary structure begins to be formed. The capillary structure forms due to the salt concentration forming, in combination with the soil media, a path through which brine could be wicked upward.

Where this zone simply ends due to concentrated brine no longer having the ability to build an appropriate capillary passage, no wicking occurs. However, as more and more brine passes through the concentrated crystalline salt at the surface layer and passes through what are effective diameter or void space capillary areas, more and more salt is deposited within the soil media to further and further extend the effective depth of a zone having an effective void space which is capable of capillary action were it to come into contact with a liquid which would be incapable of dissolving the layer, such as brine.

So, as may be seen, the process of forming this "capillary layer" continues so long as brine is continued to be introduced. The result is a layer which has very salt laden deposits near the top and possibly lesser salt laden deposits and possibly a slightly larger effective capillary cross sectional layer farther into the soil media as you proceed farther into the soil media. As more concentrated brine seeps through from the top, more salt is deposited which reduces the effective cross sectional capillary cross section further down in the layers of soil media.

Another way of looking at the process is that a wetted salt and soil media bridge is established which has the ability to draw brine upwardly. Where the upper surface is no longer sprayed with brine, water evaporation of the upper crystals will draw bring upward through the salt and soil capillary zone to the surface. At the surface, the water evaporates and leaves crystalline salt. This upper layer will continue to "grow" as it brings more and more brine through the capillary zone of the soil media.

Without the controlling process of the invention, the surface brine might typically flow through the soil and into the pool of brine existing at the sub surface level. It is the control of the invention which promotes the building of a continuous gradient capillary zone which is capable of bringing salt upwardly through the soil from a brine level which is close enough to be wicked to the surface, depending upon the type of soil and other factors. An impermeable base is not a requirement and as has been stated, in non-sabkha applications any underground soil matrix can be used as a capillary zone for storing and then retrieving brine in the production of crystalline salt.

The invention can be set up in a wide variety of soil types which have different brine levels. The ability to create and maintain the capillary zones will depend upon both the above factors (soil and brine level) as well the ability to react to those factors using sensors and the like. For example, where the brine level is near the upper surface, the depth of a working capillary zone will necessarily be thin. As another example, where the soil is of a clay consistency, very little salt accumulation will be needed to maintain a capillary zone as the soil interspacing. In a sandy soil, significant salt loading is needed to reduce the effective cross sectional area to create a capillary zone.

For example, spraying can be done, either continuously or intermittently, until the capillary zone is set up. Once the capillary zone is set up, spraying can be reduced (so long as the capillary zone is maintained) to force quite a bit more of the brine to come to the surface through the ground matrix. The rate of spraying is done in accord with a number of factors, including how much sunlight is present, whether the season is winter or summer, whether rain has occurred, the depth and vertical thickness of the capillary zone.

In addition, the inventive method is subject to the ability to change operation depending upon any immediate production needs. For example, where production is needed to be quickly increased, the spraying rate can be increased, along with controlling other factors such as aerosol size control through piezoelectric actuation of the end of the sprayer, as well as gross pressure input to produce a finer spray, as well as the night and day spraying rate. The mode of operation can be adjusted this way increase production at a smaller droplet size to insure that salt crystals fall onto the top layer and that minimal or no brine soaks through the surface layer. This mode of operation will likely represent an increase in input energy. Even where production is to slightly increase, the continued sun and wind drying of the upper layer can will still contribute to the wicking of salt laden brine through the ground layer so long at there is no net brine soaking through the upper crystalline layer.

The sun and wind change the brine from liquid to solid and indirectly contribute to the capillary action created by the crystallization of salt. The upward movement of the brine is a capillary natural process resulting from the force between the brine in the pore space column of the soil and the solid phase, the smaller the effective diameter of the column, the higher the brine will travel upward.

The capillary zone can be controlled by how much spraying is done in conjunction with the type of soil matrix present. Oven though desert soils tend to be sandy with apparent limited vertical gradient capillary zone, it has been shown that high content of calcium carbonates, a common occurrence in desert soils, increases the water holding capacity considerably which contributes to a more significant moisture content in the capillary zone. The result is a naturally wetted increased vertical expanse of capillary zone. The increased water holding capacity in the top (or any level) soil horizon acts to replenish evaporation from the surface with fresh brine from the underground water table. Any brine pulled through the soil horizon is replaced by brine from adjacent areas in a slow manner. In essence, the presence of high content of calcium carbonates vertically expands the vertical height of the capillary zone over what such vertical height would have been with simply sand and brine (forming a concentration gradient) alone. Thus, the calcium carbonates act with soil layers to produce a more finely divided soil and thus present a lesser cross sectional area to increased capillary action with less crystalline salt loading within the layer.

Many salt flat locations in deserts have brine near the surface which could be pumped; sprayed and excess brine is stored by wetting the capillary zone, except for occasional leaching to remove bitterns. Brine in the capillary zone migrates upward after spraying stops, causing more salt to be pulled up and crystallize at or near the top soil layer.

Scarcity of rainfall and low porous flat land where the underground water table is very close to the surface and is in communication with sea water during high and low tide cycles produces brine that is concentrated to the level close to sodium chloride crystallization. The problem is that the soil is often sandy with high infiltration rate. Traditionally such high infiltration rate is minimized by sealing the surface and boundaries with clay, lining, rock and concrete barriers to contain the brine and minimize downward and lateral seepage when flooding the soil. Sea water is pumped and is allowed to cascade in series of evaporation ponds, retained on the surface by the artificial impervious layer and walls, ending up in crystallizer ponds where it is collected. Extensive land, leveling, pumping and operation and maintenance are required to establish and operate such a system.

The configuration of the above mechanisms do not exist in a vacuum. One of the main purposes of this invention is to produce high quality salt for the lowest competitive cost by utilizing brine that is concentrated by renewable energy of sun and wind and the capillary action of the soil and crystallized salt. Brine which is sprayed in natural sun and wind and at a rate to assist in evaporating its water and cause it to crystallize on the surface of the ground and that which seeps to the ground is brought up to the surface by capillary action for crystallization provides a competitive alternative to current high energy, large footprint and expensive methods.

A second purpose is to use brine capillary rise within the soil or salt capillary zone to enhance crystallization and reduce dilution of already crystallized salt. A third purpose is using the brine capillary rise phenomena instead of sealing the surface and boundaries to reduce costs and expand the type of soils that can be used for brine evaporation. A fourth purpose is to crystallize the salt on the soil surface in order to harvest it with traditional salt harvesting and transport equipment, at high ease and low cost. A fifth objective is to produce very high quality salt by filtering the brine before it is sprayed to remove organic and crystallizing it quickly to arrest growth of organic contaminants. A sixth objective is to crystallize the salt on the soil surface so that it is possible to periodically wash it with excess brine to remove magnesium and potassium salts that are in solution after the salt has crystallized. A seventh purpose is to produce salt of different crystal size where small crystals can be obtained by harvesting early after crystallization and larger crystals through delayed harvesting. An eighth objective is to save on energy, manpower, production management, and heavy equipment use to make the operation much easier on labor. A ninth purpose is to minimize capital investment to further impact the market availability for and price of salt. A tenth objective is to substantially reduce the footprint of the production area to save on initial land costs and on subsequent reclamation costs. An eleventh purpose is to use sprayers on towers in order to pile the crystallizing salt around the tower and save on stacking. A twelfths objective is to use wind machines to evaporate the brine while being sprayed in ambient air during calm days. A thirteenth purpose is to enable a salt production system which will facilitate the use of renewable energy for pumping, evaporation and crystallization. A further purpose is to provide means of matching the quantity of sprayed brine with the heat input of the environment and the capillary zone brine holding capacity to minimize seepage and dilution.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
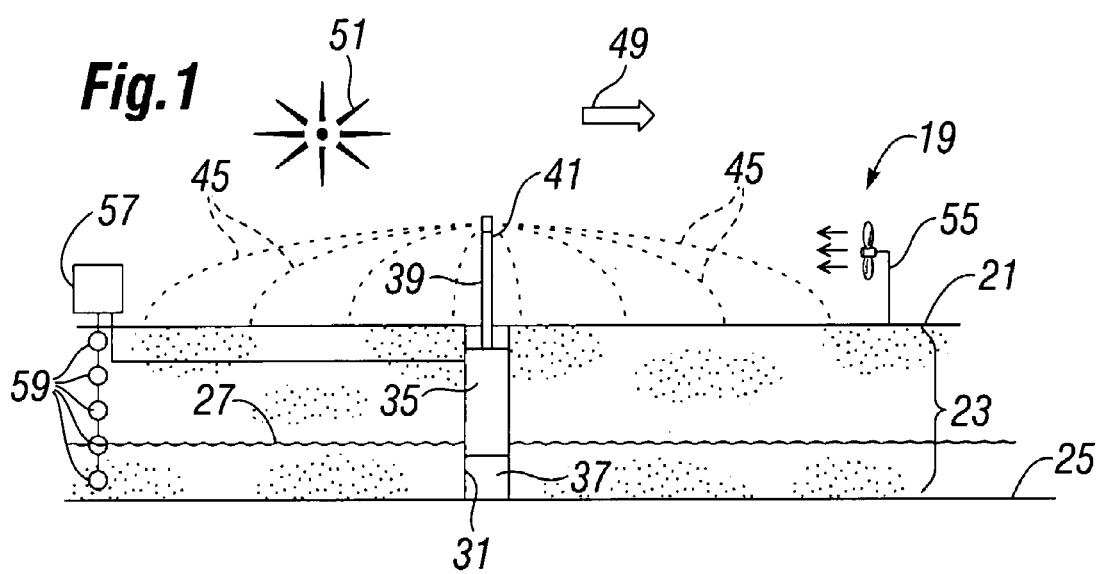
FIG. 1 is a schematic view of one embodiment in which the inventive system and components may be employed, and emphasizing a pop up sprinkler system shown in operation.

A description with the aid of schematics will be of assistance in fleshing out the further possibilities and illustrating the advantages of the inventive components and steps herein. Referring to FIG. 1, a sectional schematic looking into a sectional view of the ground of a potential configuration in which the system and process of the invention may be used. In this particular example, a central spray configuration will be shown, although any number of land and spray configurations can be used.

It is known to have circular fields and rectangular fields with a wide variety of watering and spraying mechanisms. In a round field, a spraying mechanism may be centrally located or it may be made of a linear rotational spraying mechanism which circles a round field like the second hand on a clock. A rectangular field can have a similarly moving line of sprinklers along its length. Any number of configurations are possible.

Ideally a salt brine production system 19 on a sabkha will be located on a salt flat with a brine water table located one, two or three feet from a ground surface 21. A soil matrix 23 extends downward beneath the ground surface 21 to an effective lower level 25. Soil matrix 23 can be any type of water permeable soil through which water may pass and may include soil with fine particulate matter as well as non-homogeneous components. A brine level 27 will ideally exist underneath the ground surface and overlies the effective lower level 25.

The effective lower level 25 can be due to an impermeable layer or in the case of a very deep strata, can extend downwardly for a long distance. This effective lower level is shown to emphasize that any brine which is removed will be expected to be replaced laterally, and that there should be no significant areas where the lower level 25 is above the top of the brine level 27. In Such a case, a capillary zone would either be extremely difficult to create and maintain, or it would have to be effectively lateral or slanted and thus effectively longer and difficult or impossible to maintain.

In normal circumstances, and before the components of the invention are installed and before the process of the invention is practiced, any rain reaching ground surface 21, simply washes through the soil matrix 23 before reaching the brine level 27. Over time, mixing in the brine level 27 will maintain the salt strength of the brine in the brine level 27. The soil matrix 27 can range in particulate size from clay to sand. Crystalline salt loading in a soil matrix 23 necessary to form a capillary effective cross section will be higher for sand than for clay. In some instances, such as clay, the soil matrix 23 may already be in a condition to begin wicking brine to the ground surface 21.

In order to have a supply of brine to begin to spray on top of the ground surface 21, it may be preferable to form a well 31 or to draw from an open pond or trench. The important aspect is to have a source of free liquid brine from which pumping can freely occur. The liquid capacitance of the source of free liquid bring should ideally be able to provide a significant volume of brine throughout a sustained pumping operation.

A pump 35 is in liquid contact with the brine, and as shown here extends slightly below the brine level 27 so that it has access to a brine pool or other free liquid brine volume 37. The pump 35 is in fluid communication with a sprinkler 39 which can be a pop-up sprinkler which has the ability to achieve a high level during operation, but drop back below the ground surface 21 when not in use. Sprinkler 39 can be quite high to increase the residence time in the sun and wind before droplets of brine strike the ground surface 21. This mechanism will insure that the ground surface 21 will be accessible by scraping machinery once a layer of crystalline salt is built up. A pop-up mechanism reduces the probability that any harvesting equipment might damage the sprinkler 39 if it were left in the up position.

The sprinkler 39 has an atomizing sprinkler head 41 which can preferably produce droplets of any size and can project droplets over any portion of the ground surface 21 within an effective portion of the salt brine production system 19. Much of the effectiveness of the sprinkler head 41 can be achieved with a piezo electric element which can add atomizing energy to any brine pumped from the brine pool or volume 37 by the pump 35. This system need not depend solely upon gross liquid pressure in order to operate. Further, the atomizing sprinkler head 41 can be directional and need not have to produce an effective stream 45 in all directions at once. Further, with piezo electric control the atomized droplets of brine can be directed near or far, depending upon the even-ness of coverage in a line to be produced from the sprinkler head 41. In much more advanced control systems, the wind direction, represented by the arrow 49 can be fed into a control system so that the effective streams 45 will not be unevenly distributed.

With the wind directions shown in FIG. 1, the sprinkler head 41 would fire an effective stream 45 to the left with more velocity than one to the right, in order to achieve even coverage. A good system would also take to account other aspects of the environment, including the presence of direct sun 51, temperature of the surrounding air, as well as humidity. In addition, reaction to the wind can not only be had through sprinkler head 41 and its directional and adjustable force firing mechanism, but air movement devices such as fan 55 can be used to help dry either streams 45 of falling brine droplets, or to combat the wind movement in any direction or to produce a more even coverage of the brine droplets.

Shown at the left is a sensor/controller 57 which may operate a series of moisture sensors 59 which will be able to sense moisture, perhaps even to the extent of determining the brine level 27 as well as the moisture in the soil matrix 23 between the brine level 27 and the surface 21. Thus, the sensor/controller 57 and series of moisture sensors 59 can be used to indicate the rising water content and location of that content in the soil matrix 23. This signal can be used to control the spray, and can indicate whether the operation is one of buildup or of growing salt at the surface 21. The sensor/controller 57 and series of moisture sensors 59 can enable fully automatic operation. The sensor/controller 57 is shown as being operatively connected to the pump 35. The sensors are shown to the side for convenience of illustration, but it is expected that a sensor set might be completely buried with perhaps only a controller box located above ground surface 21 in a safe location. Temperature and humidity sensors may preferably be co-located within the sensor/controller 57, and it may also control the fans 55 (only one of which is shown). Again, the provision of a flat clear ground surface 21 will contribute to harvesting.

The method to produce salt by the salt brine production system 19 herein may benefit from further instrumentation to control the flow of brine to within the boundaries of heat of evaporation and the holding capacity of the capillary zone of the soil and or crystalline salt. As the seasons change the amount of heat from the sun and wind also change. Other sensors imbedded in the capillary zone measure its brine holding capacity and measurements of evaporation from an evaporation pan through well known formulae and available software, provide the necessary information to activate the pump and spray system in order to optimize evaporation and capillary rise without excess brine discharge.

To start operations, the sprinkler head sensor/controller 57 starts the sprinkler 39 to begin producing a spray which is calculated to begin to deposit crystalline salt, as well as some droplets of very concentrated brine which are intended to begin to only slightly seep through the top crystalline layer initially set down upon the ground surface 21. Where the controls and atomization enable it, and where the conditions support it, it would be preferable to first deposit a very thin layer of crystalline salt for subsequent small droplets of brine to filter through. Proceeding in this way sets up the initial gradient and expands the gradient. If only liquid brine is sprayed directly into the soil matrix 23, without the possibility of crystalline salt being formed atop the ground surface 21, and depending on the porosity of the soil matrix 23, a salt pore gradient might not be able to be set up, or might not be as rapidly set up. If complete controllability is possible, a thin layer of crystalline salt should be applied by high atomization before larger droplets of brine are provided for soaking through it. Depending upon the conditions the spray may have to be so intermittent as to allow each micro-layer applied to the ground surface 21 to completely dry before each subsequent layer is applied and prior to generating particles of brine of sufficient size to begin to soak through a layer atop the ground surface 21.

Figure 2:
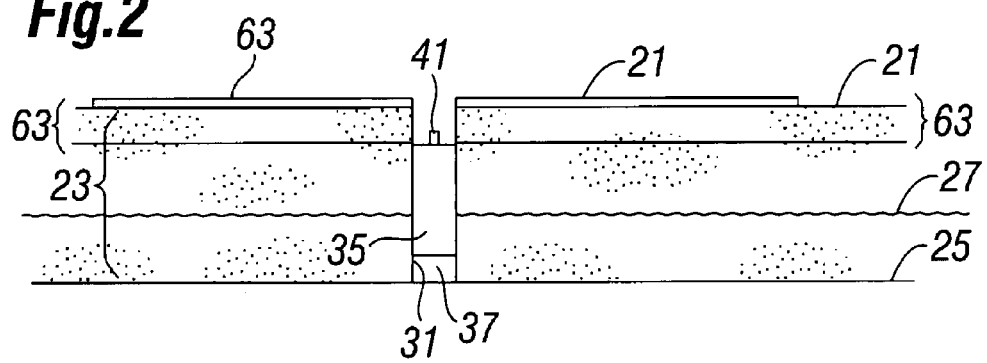
FIG. 2 is a schematic view as seen in FIG. 1, but with the sprinkler not in operation and emphasizing the layers underneath the ground level and the formation of the capillary zone along with the initial growth of the upper salt layer.

Referring to FIG. 2, a view is seen similar to FIG. 1, but eliminating a view of the sensor/controller 57 and series of moisture sensors 59, the sun 51 and wind 49, as well as deployment of the sprinkler 39 for space saving and clarity of the other features. The remainder of the showing is based upon illustrating how a capillary zone is set up and exploited. FIG. 2 represents an accurate view of what may be observed most of the time, as sprinkling is expected to be intermittent. FIG. 2 illustrates the buildup of a thin layer of crystalline salt 61 atop the ground surface 21. Additional droplets of brine are introduced which filter through the thin layer of crystalline salt 61 and begin to seep into the soil matrix 23. The brine which has seeped through the thin layer of crystalline salt 61 has only reached a point slightly below the ground surface 21 to form a capillary zone 63. The bottom of the capillary zone 63 can represent salt which came out of solution due to dryer layers of soil below the capillary zone 63, for example. The bottom of the capillary zone 63 is not in contact with any wet layer or brine and thus no capillary action is taking place. However, since the capillary zone 63 was formed slowly, it is a gradient with the uppermost layers being most heavily laden with salt and the bottom layers possibly less so. The bottom of the capillary zone 63 has not yet reached the brine level 27.

Figure 3:
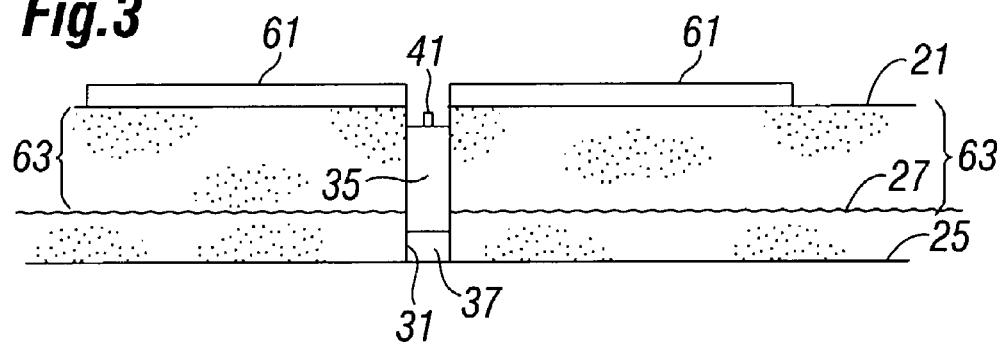
FIG. 3 is a schematic view as seen in FIG. 2, and emphasizing the continued growth of the upper salt layer along with a showing that the surface crystalline salt layer becomes part of the capillary zone.
Figure 4:
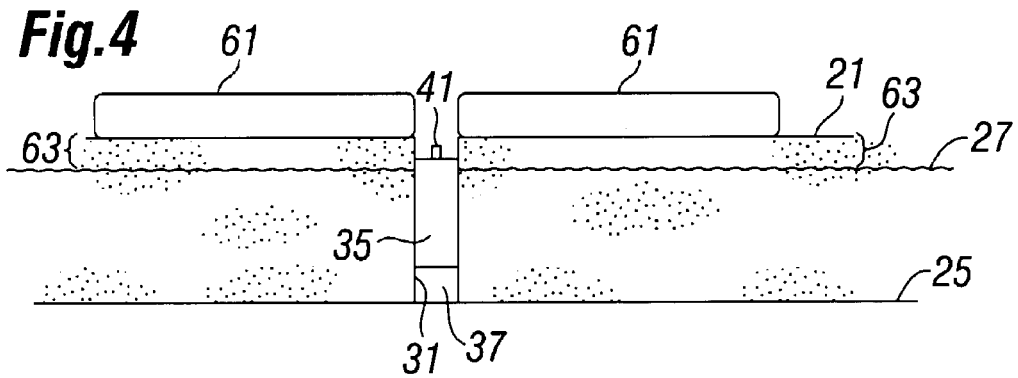
FIG. 4 is a schematic view as seen in FIG. 3, and emphasizing the continued growth of the upper salt layer along with a showing that the surface crystalline salt layer becomes an increasing part of the capillary zone.

Referring to FIG. 3, a view is seen similar to FIG. 2, illustrates an expanded capillary zone 63 which has continued to build. The layer of crystalline salt 61 is not so thin, but has been allowed to build up. This need not be the case. The layer of crystalline salt 61 can be maintained at a thin level until the capillary zone 63 can expand sufficiently to make wetted contact with the brine level 27. As soon as wetting contact is had (or as much as the even contact can be either sensed or approximated based upon a knowledge of soil permeability and size), the mode of operation is changed from a mode where the capillary zone 63 is being "set up" to a mode of operation where the spraying is severely reduced.

Once wetted contact of the capillary zone 63 is made with the brine level 27, reduced spraying enables a "dryness" gradient to be set up in which the sun 51 and wind 49 are allowed to continue to enable the layer of crystalline salt 61 to dry as much as possible consistent with the production objectives. The dryness at the top of the layer of crystalline salt 61 will create a moisture gradient vertically throughout the capillary zone 63 which will pull brine from the brine level 27 upward and through the capillary zone 63 and to the ground surface 21.

At the point before the capillary zone 63 can expand sufficiently to make wetted contact with the brine level 27, all of the layer of crystalline salt 61 will have come from spraying. Once the capillary zone 63 is enabled to bring brine through the soil matrix 23, additional growth of the layer of crystalline salt 61 will come from brine which has been drawn through the capillary zone 63 and into the layer of crystalline salt 61. Without further spraying, increases in the crystalline salt 61 will come from below. Brine which is drawn through the soil matrix and into the layer of crystalline salt 61 will be deposited into the layer of crystalline salt 61. The layer of crystalline salt 61 may grow from the bottom, through the top or by vertical expansion. Much may depend upon whether the layer of crystalline salt 61 is compacted, and how rapidly it is formed. Rapid formation very likely encourages a light fluffy consistency which can produce greater drying by the wind and sun due to the expanded surface area presented at the top layer.

Further operations can be controlled by either spraying or not spraying. Where no further spraying is performed, the layer of crystalline salt 61 simply grows in thickness over time to the extent its moisture content is replenished from brine spraying and evaporation is allowed to continue. For harvesting, small bulldozers or other mechanical scrapers are able to skim the surface of the layer of crystalline salt 61. In some cases scraping may be by a suspended blade mechanism to help prevent overall random compaction of the layer of crystalline salt 61. Where the layer of crystalline salt 61 is compacted, it will not function as efficiently as a low density growth layer. Blades, scrapers and other devices can be suspended as by a scraper bucket and drag line to eliminate compaction from supporting the equipment. In other cases, defined areas can be designated for compaction, such as designated tire or tread areas, to free the other areas for low density layer of crystalline salt 61 growth. Where a circular field is used, a harvester can be periodically run about the center point much like the second hand on a clock. This type of fixed operation harvesting can slice or vacuum the top of the layer of crystalline salt 61 to keep it fluffy and of low density.

As mentioned earlier, further spraying can be limited to that which will not impact the moisture at the top of the layer of crystalline salt 61, such as spraying to create droplets so small that they dry in the wind to crystalline form before they reach the top of the layer of crystalline salt 61. It is clear that further spraying will be energy intensive, whereas growth of the layer of crystalline salt 61 solely from brine drawn through the capillary zone 63 will be passive and drawn through the action of wind 49 and sun 51 alone. As a result, the production can be optimized for slow inexpensive production, high cost high production, or a mixture of the two.

The process can work well in open areas. In the event of rain, especially during set up of the capillary zone 63, the spraying operation is simply suspended for a sufficient time to allow the rain which soaked through the layer of crystalline salt 61 to "back dry". In the alternative, if there is enough layer of crystalline salt 61 present to not have a break through dissolution, spraying could be accomplished in the same manner as the initial establishment of the layer of crystalline salt 61, with the assumption that any rain which was filtered through the layer of crystalline salt 61 was completely saturated and laden with salt to the same extent as would be the case had penetrating brine been sprayed. The boundaries of the production field may be protected from flooding by levies.

FIG. 3 illustrates a case where the brine layer is deeper and where the capillary zone 63 was vertically more deep. A deeper capillary zone 63 will translate to a slower salt production through the ground surface 21. Referring to FIG. 3, a view of a soil matrix 23 with a brine level which is higher and closer to the ground surface 21 is shown. This is the optimum configuration for a higher rate of salt production through the ground surface 21. The system of the invention performs best in areas with a brine level which is nearer the ground surface 21. However, more finely divided soil, such as fine clay could result in a slower production rate.

There are other considerations in locating a production facility of the salt brine production system 19. Desirable brines should have salt concentration close to that at which sodium chloride crystallizes. Salts that are more soluble than sodium chloride are already precipitated and crystallized. A simple filter can be used in the spraying system to removes organic matter and insure that the layer of crystalline salt 61 is not contaminated and has no impediment to being low density, fluffy and moisture transmissive. Pumps 35 specially made to pump brine are used. The spray system could be selected from a number of spraying system including center pivot, lateral, spray gun and fixed systems made from plastic, polypropylene and PVC or similar low cost salt resistant materials. The design of the salt brine production system 19 is topologically analogous in area and material movement to an irrigation system except that the intent is to vaporize water. The water holding capacity is that determined by the capillary zone and the degree to which moisture is restricted on the wetted surface of the layer of crystalline salt 61 and the wetted distance from the ground surface 21 to the lower limit of capillary zone.

As the surface of the layer of crystalline salt 61 the heat impacting the surface creates suction and the capillary action lifts the brine in the capillary zone 63 to the surface where it is evaporated and its salt is deposited and crystallized. The same capillary process takes place in the soil matrix 23. The combination of spraying the brine, wetting the capillary zone 63 of the soil and or the salt of the layer of crystalline salt 61 on the surface coupled with heat from the sun 51 and wind 49 results in the growth of a salt layer which could be collected by salt harvesting equipment. It may be preferable to allow harvesting of only the uppermost portion of the layer of crystalline salt 61 to insure that the collected product is dryer. This may involve more frequent harvesting of lesser amounts of the layer of crystalline salt 61 to insure an immediately dryer product.

Salt collection may also be limited to a schedule where the layer of crystalline salt 61 has grown to a depth of 50 or more centimeters such that the harvester scrapes the top 20 or more centimeters leaving a salt pad of from about 10 to 30 cm to insure that the soil from the ground surface 21 is not scraped with the salt collected in the harvesting process. Much may therefore depend upon product needs and harvesting equipment capability. Different industries require different crystal size salt. Finer crystals are produced if harvesting takes place in a short time after salt crystallization. Larger crystal size is produced from leaving the salt for a longer period of time as this will allow the crystals to grow and infuse into each other.

Depending on the size and shape of the fields, there are many ways of spraying the brine. The primary ways are either stationary or mobile. A stationary sparing system includes fixed structures such as a network of pipes, valves and sprayers. The sprayers could be pop-up type which is recessed below surface level when not spraying so as not to interfere with harvesting equipment. Sprayers attached to risers will require the risers removed temporarily for harvesting. Other types of stationary spray systems are towers that may be as high as 10 meters, with sprayers radially attached at the top, to a pressurized main brine feed line. Such towers may include wind machines as used in the fruit trees frost protection industry. The tower will need a shield around it inclosing the service ladder with enough space for a service person to go up the ladder to maintain the sprayers, fans and gears. A canopy that protects the entrance to the shielded ladder provides access to the tower. Such stationery tower systems will deposit the salt in a conical shape if no fans are used. Such a shape may be advantageous as a piling method. A loader loads the salt from the pile or stack to a dump truck for transport. Mobile spraying systems include center pivot irrigation systems where a large pipe that may be half a mile long, supported by a truss and gear driven tires, pivots around its center where the brine is feed. The same system may be used but move laterally rather than in a circle, where the brine is feed from an underground pipe with risers or more simply from a canal on either the side or the middle of the lateral spray system. Other moving spray systems are lateral move and spray gun systems to mention a few. These spray systems may be modified for salt applications by replacing standard steel pipes with corrosion resistant materials, coating or adding a plastic pipe, supported by the structure of the system, with much less diameter since spray systems are designed for irrigation purposes which carry much more flow than brine intended to be sprayed to produce salt.

The salt brine production system 19 uses a fraction of the land area foot print of currently used open salt production systems. Production of one million tons of crystalline salt using the brine capillary salt crystallization system requires less than ten percent of systems that pump sea water into evaporation and crystallization ponds. The method and apparatus described in this invention uses no heavy equipment, other than the harvester and dumb truck, to transport salt to the wash plant compared to conventional mining of solid salt using dredging equipment, excavators, loaders, crushers and screens to prepare the salt for the wash plant. The salt brine production system 19 and process thus described uses limited manpower compared to evaporation and crystallization ground spreading methods or solid salt mining.

While the present invention has been described in terms of a salt brine production system and components used to affect the process of setting up and maintaining a capillary zone in a soil or ground matrix and which may be used with or without a spraying system once the capillary zone is set up, a wide variety of alternate land areas, sprayers, sensors and controllers within the teaching above can be used to make a wide variety of alternate variations thereof.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A process for producing salt from brine comprising the steps of:

outputting atomized concentrated brine from an atomizing sprinkler head of sufficiently small size as to form crystals before falling from said atomizing sprinkler head to a ground surface to form a layer of crystallized salt on said ground surface; and collecting at least a portion of said formed layer of crystallized salt from said ground surface.

2. The process for producing salt from brine as recited in claim 1 wherein said a ground surface overlies a soil matrix having a brine level, and further comprising the steps of:

outputting atomized concentrated brine from an atomizing sprinkler head of sufficiently large size to penetrate into said ground surface through said formed layer of crystallized salt on said ground surface to insure that saturated brine penetrates said ground surface and into said soil matrix to form a capillary zone within said soil matrix; and limiting said outputting atomized concentrated brine from an atomizing sprinkler head to allow brine from said brine level within said soil matrix to rise by capillary action through said capillary zone within said soil matrix to reach said ground surface to contribute to said layer of crystallized salt on said ground surface.

3. The process for producing salt from brine as recited in claim 2 wherein said a ground surface overlies a soil matrix having a brine level, and further comprising the step of detecting the presence of said capillary zone using moisture detectors within said ground matrix.

4. The process for producing salt from brine as recited in claim 2 wherein said and further including the step of collecting at least a portion of said formed layer of crystallized salt from said ground surface leaves an average of about five to ten centimeters of said formed layer of crystallized salt to insure that said ground surface is not disturbed during said collecting at least a portion of said formed layer step.

5. The process for producing salt from brine as recited in claim 2 wherein said and further including the step of controlling a crystal size of said formed layer of crystallized salt on said ground surface by managing the rate of production from said capillary zone and the frequency with which said collecting at least a portion of said formed layer step is performed.

6. The process for producing salt from brine as recited in claim 2 wherein said size of said outputted atomized concentrated brine from an atomizing sprinkler head of sufficiently small size as to form crystals before falling from said atomizing sprinkler head to a ground surface is computed and controlled based upon at least one of: the height of the atomizing sprinkler head, the travel time from said atomizing sprinkler head to ground, wind direction, wind speed, concentration of said concentrated brine and the presence of sunlight.

7. The process for producing salt from brine as recited in claim 2 and further comprising the step of moving air over said ground surface to assist in at least one of the transport of water out of said atomized concentrated brine from an atomizing sprinkler head and the transport of water from said layer of crystallized salt from said ground surface.

8. The process for producing salt from brine as recited in claim 1 where said atomizing sprinkler head is a first atomizing sprinkler head and wherein said ground surface is a first ground surface associated with said first atomizing sprinkler head and further comprising the step of co-locating at least a second ground surface with an associated at least a second atomizing sprinkler head adjacent said first ground surface.

9. The process for producing salt from brine as recited in claim 1 and further comprising the process of sensing moisture, beneath said ground surface to assist in control of at least one of controlling the spray, and indicating whether the operation is one of buildup or of growing salt at said ground surface.

10. The process for producing salt from brine as recited in claim 9 wherein the process of sensing moisture, beneath said ground surface occurs at a multiplicity of depths with respect to said ground surface.

11. The process for producing salt from brine as recited in claim 2 and further comprising the process of sensing moisture, beneath said ground surface to assist in control of at least one of controlling the spray, and indicating whether the operation is one of buildup or of growing salt at said ground surface.

12. The process for producing salt from brine as recited in claim 11 wherein the process of sensing moisture, beneath said ground surface occurs at a multiplicity of depths with respect to said ground surface.

13. The process for producing salt from brine as recited in claim 1 and further comprising the process of sensing moisture, beneath said ground surface to assist in control of forced air movement over said ground surface.

14. The process for producing salt from brine as recited in claim 2 and further comprising the process of sensing moisture, beneath said ground surface to determine a height of said brine level.

15. The process for producing salt from brine as recited in claim 1 and further comprising the step of retracting said atomizing sprinkler head to a reduced height position with respect to said ground surface to facilitate said collecting at least a portion of said formed layer of crystallized salt from said ground surface step.

* * * * *